Patented May 17, 1938

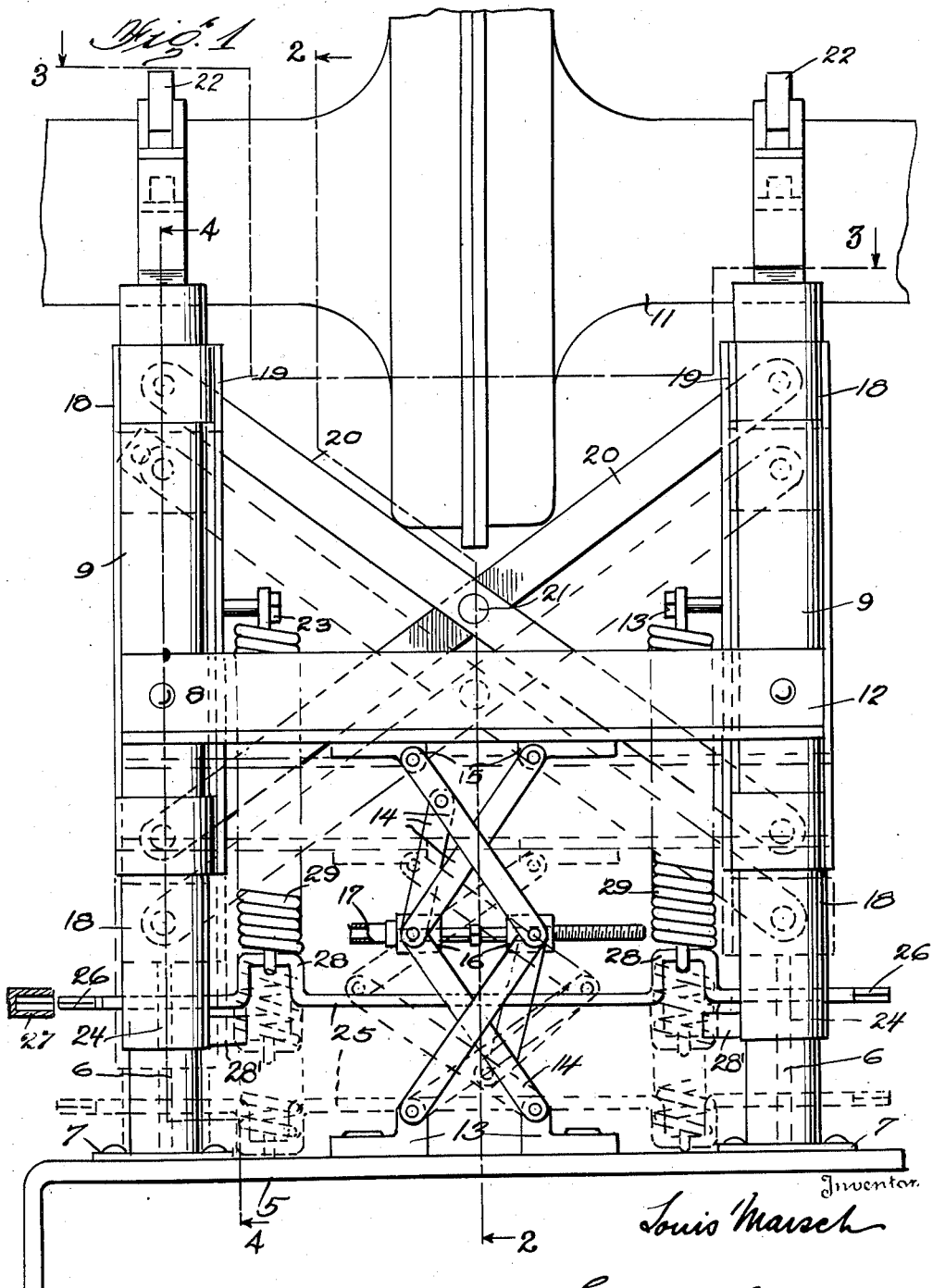

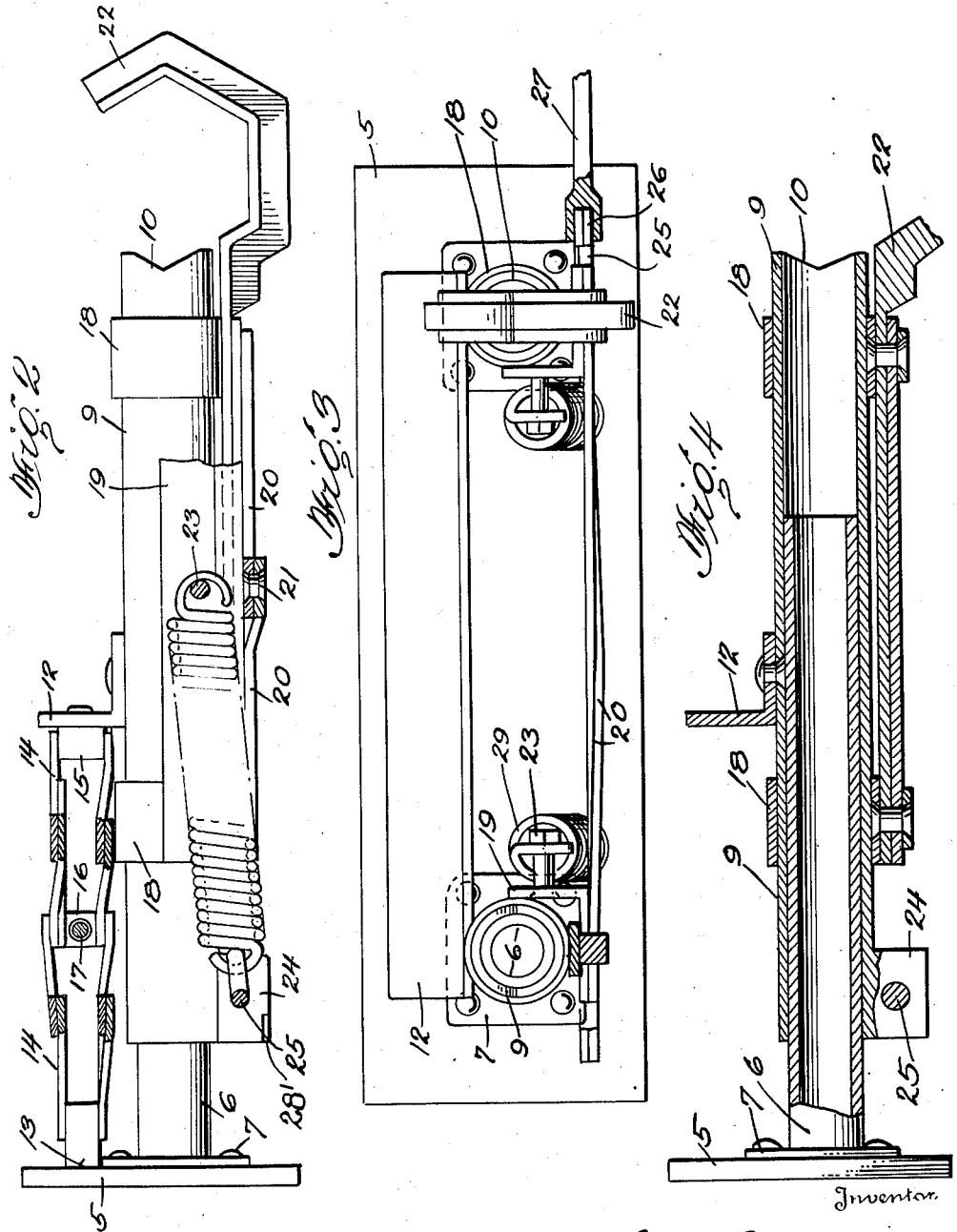

2,117,562

UNITED STATES PATENT OFFICE 2,117,562

TRAILER HITCH

Louis Marsch, Morrisonville, Ill.

Application December 15, 1937, Serial No. 180,007

5 Claims. (Cl. 280—33.44)

My invention as disclosed in the following specification and appended drawings relates to a trailer hitch intended primarily to connect a motor vehicle with another vehicle which it is intended to have the motor vehicle draw. The problem of designing such a hitch consists in providing suitable connections by which the trailer may be held at the desired distance behind the motor vehicle; clamped into position and drawn at reasonable speed with a minimum of response to the irregularities caused by the movements of the motor vehicle and of the ground over which the vehicles move.

In road making and in agricultural work trailers are frequently drawn along for the purpose of evenly distributing material either over a road bed or a field. If the draft connection between the vehicles is rigid the trailer will respond to every slight movement of the motor vehicle whether it be a sudden forward movement or a vertical rise and fall caused by spring action. If the trailing vehicle is being operated to discharge material the result is an uneven distribution. One of the objects of my invention is to provide draft equipment by which the trailing vehicle is protected from sudden or irregular movement that might be caused by the motor vehicle.

Another object of my invention is to provide convenient means for facilitating the engagement of the draft or hitch equipment with the rear axle of the motor vehicle.

A further object of my invention is to preserve the proper spacing between the two vehicles after attachment.

A still further object of my invention is to provide tension means by which irregular movement on the part of the motor vehicle will be adequately absorbed without being transmitted to the trailing vehicle.

Rugged construction and ease of manufacture or assembly are characteristic of the device disclosed in this specification.

The preferred form of my invention has been illustrated in the accompanying drawings in which Fig. 1 is a plan view of my vehicle hitch;

Fig. 2 is a longitudinal vertical elevation on the line 2—2 of Fig. 1;

Fig. 3 is a vertical transverse section on the line 3—3 of Fig. 1 and

Fig. 4 is a fragmentary vertical section on the line 4—4 of Fig. 1.

By way of example I have shown in the drawings a vehicle or trailer hitch comprising four principal parts. The main frame is arranged to be attached to the trailing vehicle. This main frame carries an adjustable frame by which the normal spacing between the vehicles is maintained by means of a primary adjustment.

The adjustable frame carries a slidable frame which forms one engaging means for connection with the motor vehicle. Tension means are provided for adjustably accomplishing this engagement and for holding the parts in position during traction.

The main frame consists of a plate 5 of suitable form and size adapted to be connected to the trailing vehicle or form a part of the same. This plate carries two beams 6, 6 which extend parallel to each other. The beams have flange plates 7, 7 by which they are suitably attached to one side of the plate 5.

An adjustable frame 8 is slidably mounted upon the beams 6, 6. This frame comprises a pair of tubes 9, 9 which are slidably mounted upon the beams 6, 6. The outer ends of the tubes 9, 9 are recessed as shown at 10 in Figs. 2 and 4 to provide engaging recesses or yokes to receive the conventional axle housing 11 of the motor vehicle such as a truck or tractor.

The tubes 9, 9 are held in spaced relation by means of a cross bar 12 which may be L-shaped in cross-section as shown in Fig. 2. The cross bar 12 is mounted above the tubes 9, 9. The position of the adjustable frame can be varied by means of a screw jack, one end of which is mounted in brackets 13, 13 on the plate 5. A series of crossed arms 14, 14 form links in the jack and have their opposite free ends held in brackets 15, 15 on the flange of the angle bar 12. The midpoints of the links are connected to collars 16, 16. An adjusting screw 17 passes through the collar 16, 16 and permits movement of the cross bar 12 toward and away from the plate 5. In this manner the frame comprising the tubes 9, 9 is placed in an adjustable position for being clamped against the rear axle housing 11.

A sliding frame which may be termed the draft frame is carried upon the adjustable tubes 9, 9. This draft frame consists of collars 18 which in turn are slidable upon the tubes 9, 9. Each tube carries a pair of collars 18 spaced apart by means of the angle irons 19, 19. These angle irons are attached below and on the inside peripheries of the collars 18, 18.

The angle irons 19, 19 are maintained in parallel extended position by means of the cross braces 20, 20 connected at the center by bolt 21. In this way, the draft frame is constituted by the sliding collars 18, the plates 19 and the cross braces 20.

Means are provided on the draft frame for clamping the tube ends 10 to an axle housing. This means consists in a pair of clamp arms 22, 22 suitably attached to the angle irons 19, 19. As the draft frame is drawn in toward the plate 5 the clamping arms 22, 22 will bring the axle housing 11 into engagement with the recesses 10, 10.

The sliding draft frame is held in clamping position by means of suitable tension means connecting this sliding frame with the adjustable frame. As shown in Fig. 1, the draft frame has inwardly projecting studs 23, 23 mounted upon the inner flanges of the plates 19, 19. While independent lugs have been illustrated an equivalent means of course would be a bar extending the full distance between the plates 19, 19.

On the inner end of each tube 9, 9 there is attached a strap or other member 24, 24 adapted to form a pair of journals. Journaled in the members 24, 24 there is a crank shaft 25. This crank shaft has a squared end 26 at each end by which a socket tool 27 may be applied to give partial rotation to the crank shaft. Between the journals 24, 24 the crank shaft has offset cranks 28, 28. These cranks form one attaching means for heavy coil springs 29, 29. The opposite ends of these coil springs are held by the studs 23, 23 or the equivalent cross bars.

A stop 28' is provided extending inwardly from one or both of the journal members 24 and limits the extent to which the crank 28 may be rotated. As this is just past the dead center it forms a means for holding the spring under considerable tension. The proportion of the coil springs 29, 29 are such that when in the position shown in full lines in Fig. 1, they serve as push rods for forcing the clamp hooks 22, 22 out of engagement with the axle housing and thus permit ready disengagement of the vehicle.

The studs 23, 23 or the corresponding cross bar may be adjusted longitudinally of the plates 19, 19 so that suitable tension may be obtained for the coil springs 29, 29.

It will be quite apparent from the above description that this design provides a vehicle hitch of rugged and simple character. The adjustable frame can be extended away from the plate 5 in case greater spacing between the vehicles is desired. It may, however, be brought close to plate 5 as indicated in the dotted lines of the same figure.

Once having been adjusted the adjustable frame need not be varied in its position so long as it is used for engagement with the same type of motor vehicle. The actual engagement with the motor vehicle is carried out by extending the clamp hooks 22, 22 as shown in full lines in Figure 1. After the clamping recesses 10 and the clamp hooks 22 have been placed in position on opposite sides of the axle housing 11, the tension springs 29, 29 are stretched with the crank shaft 25 in the dotted line position. This results in bringing the clamping hooks 22 against the axle housing and clamping the latter against the recessed portions 10. As the cranks 28 go past the dead center and rest against the top 28' this position is maintained during normal operation of the vehicles.

As the trailer is drawn by the motor vehicle the engagement is maintained by the clamp hooks 22, 22. The adjustable frame maintains the desired spacing between the vehicles while the tension means between the adjustable frame and the draft frame protects the trailer from the sudden irregular motion of the motor vehicle or its axle.

In this way the load of the trailer is carried with greatest care. If the load of the trailer is being mechanically distributed it will be found that this distribution is entirely uniform and not affected by the irregular movements of the motor vehicle.

Disengagement of the trailer from the motor vehicle is of course a matter simply of giving crank shaft 25 a half turn so that the coil springs 29, 29 are restored to a condition of repose and may even be used in their final movement to spread the clamp hooks 22, 22 away from the axle housing 11.

While I have illustrated the preferred form of my invention it has been done merely by way of example and without limiting the scope of the invention beyond the express terms of the appended claims.

What I claim is:—

1. A trailer hitch comprising a main frame including parallel beams, an adjustable frame comprising two tubes slidable over the beams, each of said tubes being recessed at one end to fit an axle housing of a vehicle, and a cross-bar connecting said tubes; a lazy-tong jack holding the adjustable frame in adjustable position on the beams; a draft frame comprising collars slidable on said tubes, side members spacing the collars, anchors on the side members, diagonal braces between the side members and axle hooks cooperating with the recessed ends of the tubes; and tension means comprising a shaft journaled on the tubes, offset cranks on the shaft and coil springs between the cranks and the said anchors.

2. A trailer hitch comprising a main frame for attachment to a trailing vehicle; an adjustable frame and means for holding the same in fixed position on the main frame; a draft frame movable on the adjustable frame; cooperating means on the adjustable frame and the draft frame for engaging a tractor vehicle; and tension means connecting the two last named frames.

3. A trailer hitch comprising a main frame for attachment to a trailing vehicle; an adjustable frame slidably mounted on the main frame, a lazy-tong jack fixedly mounted on the main frame and attached to the adjustable frame, a draft frame movable on the adjustable frame, cooperating means on the adjustable frame and the draft frame for engaging a tractor vehicle, and tension means connecting the two last named frames.

4. A trailer hitch comprising a main frame for attachment to a trailing vehicle; an adjustable frame slidably mounted on the main frame, a lazy-tong jack fixedly mounted on the main frame and attached to the adjustable frame, a draft frame movable on the adjustable frame, axle engaging means on the adjustable frame, axle clamping means on the draft frame, and tension means connecting the two last named frames.

5. A trailer hitch comprising a main frame for attachment to a trailing vehicle; an adjustable frame slidably mounted on the main frame, a lazy-tong jack fixedly mounted on the main frame and attached to the adjustable frame, a draft frame movable on the adjustable frame, axle engaging means on the adjustable frame, axle clamping means on the draft frame, a crank shaft journaled on the adjustable frame and tension means connecting the crank shaft with the draft frame.

LOUIS MARSCH.